United States Patent
Deakin et al.

(10) Patent No.: US 10,148,445 B2
(45) Date of Patent: Dec. 4, 2018

(54) MANAGING TIME-DEPENDENT ELECTRONIC FILES

(71) Applicant: INTERNATIONAL BUSINESS MACHINES CORPORATION, Armonk, NY (US)

(72) Inventors: Oliver M. Deakin, Hursley (GB); Robert B. Nicholson, Hursley (GB)

(73) Assignee: International Business Machines Corporation, Armonk, NY (US)

(*) Notice: Subject to any disclaimer, the term of this patent is extended or adjusted under 35 U.S.C. 154(b) by 76 days.

(21) Appl. No.: 14/943,444

(22) Filed: Nov. 17, 2015

(65) Prior Publication Data

US 2016/0156477 A1 Jun. 2, 2016

(30) Foreign Application Priority Data

Nov. 27, 2014 (GB) .................................. 1421035.5

(51) Int. Cl.

| H04L 29/06 | (2006.01) |
|---|---|
| H04L 9/32 | (2006.01) |
| G06F 8/65 | (2018.01) |
| G06F 9/48 | (2006.01) |
| G06F 9/50 | (2006.01) |
| G06F 11/14 | (2006.01) |
| G06F 9/46 | (2006.01) |
| G06F 11/07 | (2006.01) |

(Continued)

(52) U.S. Cl.
CPC .............. H04L 9/3297 (2013.01); G06F 8/65 (2013.01); G06F 9/4887 (2013.01); H04L 9/3263 (2013.01); G06F 3/04845 (2013.01); G06F 9/46 (2013.01); G06F 9/505 (2013.01); G06F 11/0733 (2013.01); G06F 11/1471 (2013.01); G06Q 30/018 (2013.01); H04L 63/0823 (2013.01); H04L 63/0853 (2013.01)

(58) Field of Classification Search
None
See application file for complete search history.

(56) References Cited

U.S. PATENT DOCUMENTS 5,515,490 A * 5/1996 Buchanan ......... G06F 17/30017
 375/E7.006
7,529,928 B2 5/2009 Micali
(Continued)

FOREIGN PATENT DOCUMENTS

| JP | 2005217886 A | 8/2005 | |
|---|---|---|---|
| WO | WO03009164 A2 | 1/2003 | |
| WO | WO 03009164 A2 * | 1/2003 | ....... G06F 17/30471 |

OTHER PUBLICATIONS

Search Report for GB1421035.5 dated May 27, 2015, pp. 1-4.

*Primary Examiner* — Kambiz Zand
*Assistant Examiner* — Arezoo Sherkat
(74) *Attorney, Agent, or Firm* — Heslin Rothenberg Farley & Mesiti P.C.

(57) ABSTRACT

Managing time-dependent electronic files. A set of time-dependent files is identified. A time period for processing for each file resulting in a set of time periods is identified. A minimum set of time instances that gives one time instance in each time period in the set of time periods is calculated. Batching for each time instance of the minimum set of time instances, a sub-set of files to be processed at the time instance.

20 Claims, 6 Drawing Sheets

(51) Int. Cl.
   *G06Q 30/00* (2012.01)
   *G06F 3/0484* (2013.01)

(56) References Cited

U.S. PATENT DOCUMENTS

| | | | |
|---|---|---|---|
| 7,707,406 B2* | 4/2010 | Qiu | G06F 21/33 |
| | | | 713/155 |
| 8,526,460 B2* | 9/2013 | Booton | G06F 9/4887 |
| | | | 370/395.4 |
| 8,572,045 B1* | 10/2013 | Shah | G06F 11/1471 |
| | | | 707/674 |
| 8,627,063 B2 | 1/2014 | Edstrom et al. | |
| 8,935,524 B1* | 1/2015 | Lawrence | H04L 63/0823 |
| | | | 713/156 |
| 2005/0091484 A1 | 4/2005 | Thornton et al. | |
| 2006/0080656 A1* | 4/2006 | Cain | G06F 8/65 |
| | | | 717/174 |
| 2006/0190938 A1* | 8/2006 | Capek | G06F 9/46 |
| | | | 717/161 |
| 2007/0118875 A1 | 5/2007 | Chow et al. | |
| 2008/0163228 A1* | 7/2008 | Murata | G06F 9/505 |
| | | | 718/103 |
| 2009/0222403 A1* | 9/2009 | Kato | G06F 11/0733 |
| 2009/0245519 A1* | 10/2009 | Cachin | G06F 21/6209 |
| | | | 380/277 |
| 2011/0113239 A1 | 5/2011 | Fu et al. | |
| 2013/0179877 A1* | 7/2013 | Dain | G06F 8/60 |
| | | | 717/178 |
| 2013/0290970 A1* | 10/2013 | Shah | G06F 9/4887 |
| | | | 718/102 |
| 2014/0136839 A1* | 5/2014 | Thayer | H04L 63/0823 |
| | | | 713/156 |
| 2015/0355824 A1* | 12/2015 | Ueno | G06F 3/04845 |
| | | | 715/751 |
| 2016/0112677 A1* | 4/2016 | Lee | H04N 7/181 |
| | | | 348/159 |

* cited by examiner

MANAGING TIME-DEPENDENT ELECTRONIC FILES

PRIOR FOREIGN APPLICATION

This application claims priority from United Kingdom (GB) patent application number 1421035.5, filed Nov. 27, 2014, which is hereby incorporated herein by reference in its entirety.

BACKGROUND

One or more aspects of the invention relate to the field of managing time-dependent electronic files. In particular, one or more aspects of the invention relate to managing time-dependent electronic files to enable batch renewal of files.

In distributed networks of systems where transmissions between nodes are likely to travel over unprotected network infrastructure or when nodes may be in unsecured locations, security of communications is key to avoid man-in-the-middle or other various attacks. A typical method of achieving this security is the use of X.509 certificates as proof of identity, with each node or individual elements within each node having individual certificates. Once all elements have appropriate certificates then use of protocols such as Transport Layer Security (TLS) becomes a viable solution to provide authentication and encryption on the wire.

The standard method by which the identity contained in a certificate is authenticated is as follows. The certificate is cryptographically signed by a centralized Certificate Authority (CA) before distribution to the entity it belongs to. When the certificate is authenticated, for example, as part of a TLS handshake when the entity connects to a service, this signature is verified to prove the certificate identity is genuine and trusted by the CA.

Certificates also have a lifespan defined by a validity start and end time. In some systems, these lifespans may be intentionally chosen to be short, so that if that entity's credentials were compromised they would only allow a small window of exposure where they could be used before the certificate expired and could no longer be used for TLS connections. When certificates need to be renewed, the typical mechanism is to generate a Certificate Signing Request and send that request (over some protocol, such as a Certificate Management Protocol (CMP) or Hypertext Transfer Protocol (HTTP)) to the CA, who then generates a new signed certificate for that entity with a validity period starting at the current time and responds. The entity then uses that new certificate for future connections.

In cases where network bandwidth between the nodes and the centralized CA is restricted, it may be costly for every individual entity to send separate requests to the CA to renew their certificates when required, as the overhead of the protocol the request is sent over is incurred for every request. There may also be optimal time windows in which requests would be sent, where the network is under lower load.

SUMMARY

Shortcomings of the prior art are overcome and additional advantages are provided through the provision of a method of managing time-dependent electronic files. The method includes identifying a set of time-dependent files; identifying a time period for processing for each file of a plurality of files of the set of time-dependent files, resulting in a set of time periods; calculating a minimum set of time instances that gives one time instance in each time period in the set of time periods; and batching, by a processor, for each time instance of the minimum set of time instances, a sub-set of files to be processed at the time instance.

Computer program products and computer systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
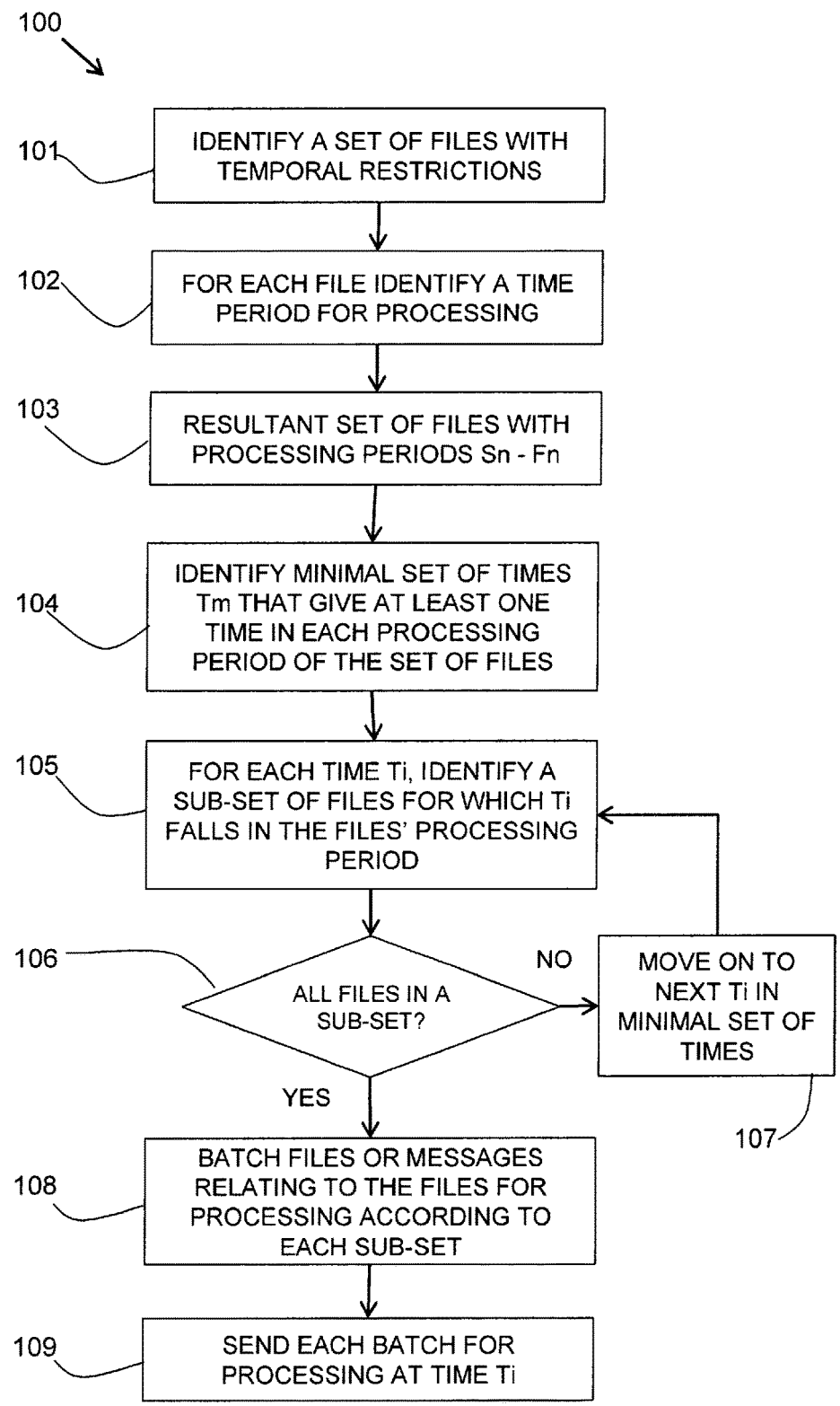
FIG. 1 is a flow diagram of an example embodiment of a method in accordance with an aspect of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

One or more aspects of the invention relate to the security of the "Internet of things" (IoT). In the IoT, devices are not physically secure, they can be physically compromised and the private keys relating to the certificates can be stolen. Hence the need for short-lived certificates reducing the need to revoke certificates for a device whose physical integrity can no longer be assured. The security of the IoT is a significant focus area for the industry in general.

New certificates are to be generated before the previous certificate expires, otherwise the entity that certificate belongs to essentially becomes locked out from making any secured connections. This could be achieved by simply renewing certificates when a certain threshold age is reached. This is satisfactory where the number of individual requests generated and sent over the network does not matter, but in the case where overhead of sending requests and reducing network traffic is to be minimized this is not ideal.

Thus, one or more aspects of the present invention address one or more of the above.

In the following detailed description, numerous specific details are set forth in order to provide a thorough understanding of aspects of the invention. However, it will be understood by those skilled in the art that aspects of the present invention may be practiced without these specific details. In other instances, well-known methods, procedures, and components have not been described in detail so as not to obscure aspects of the present invention.

A method, system and computer program product are provided for managing time-dependent electronic files (referred to herein as files) and processing the files in a required time period for each file. In one example embodiment, the time-dependent electronic files may be security certificates which have a validity period, for example, public key certificates (also known as X.509 certificates, digital certificates, identity certificates, or authorization certificates). In another example embodiment, the time-dependent electronic files may have updates that need to be applied in a timely manner, such as security updates.

A period within the lifespan of a file during which a network operator wishes a file to be renewed is determined. For example, the network operator may define that a file in the form of a certificate is to be renewed when the current certificate is within 40-60% of its current lifespan so there is sufficient time for the request to be responded to and for the entity to receive its new certificate and start using it before the current certificate expires.

Overlaps between renewal periods of multiple files are used to minimize the number of individual requests sent over the network to a central renewal location and to optimize when to send the renewal requests. For example, if multiple certificates require renewal, the number of certificate signing requests (CSRs) in each request is maximized for sending to a Certificate Authority (CA).

Clusters of systems may have their processing of time-dependent electronic files managed by some element local to those clusters, such as a proxy service which is referred to as a processing manager. The processing manager may batch renewal requests for files from the cluster of systems and may distribute renewed files back to the systems.

In the embodiment of security certificates, the processing manager may batch requests for certificate renewal from multiple systems together for renewal by a CA and distribute the renewed certificates back to those systems.

Referring to FIG. 1, a flow diagram 100 shows an example embodiment of the described method as carried out at a processing manager for a group of systems having time-dependent electronic files which are to be processed in a given time frame.

A set of files each having a temporal restriction is identified 101. For each file a time period is identified 102 in which processing is to be carried out on the file. This results 103 in a set of time periods with a start time, Sn, and a finish time, Fn. Sn is the earliest time that the file should be processed and Fn is the latest time that the file should be processed. It should be noted that more than one file may have the same time period. In one embodiment, the time period is a renewal period for renewing the file, however the time periods may be for other file processing purposes.

A process is carried out to identify 104 the minimal set of time instances Tm that gives at least one time instance in each time period in the set. There are various methods that may be used for identifying the minimal set of time instances.

As one example, the following method may be used. Start from an earliest time and place a point at the first finish time arrived at—this will satisfy the first interval and any intervals that overlap it. Then continue to the finish time of the next interval that does not yet contain a point and place a point at that finish time. Repeat this step until all the intervals contain a point. This method may prefer a later renewal time than necessary, as the last time in the overlapping interval is chosen as the renewal time. This may be desirable in some scenarios.

It is also possible to reverse this process to start with the latest finish time and work backwards looking for the next start time hit, with the option here to choose that time as the renewal. This will give different renewal times for the same set of intervals, preferring later renewals over earlier ones.

This gives a set of time instances at which to process the files with the minimal set of request overheads.

For each time Ti in the minimal set of time instances, a sub-set of files is identified 105 for which the time instance Ti falls in their processing time period.

It is determined 106 if all the files in the original set are in sub-sets identified in step 105. If there are remaining files in the original set, then the method moves 107 on to the next Ti in the minimal set of times.

Once all the files are sorted into sub-sets, the files are batched 108 for processing in their sub-set. Each batch may be sent 109 for processing at the time instance Ti for that sub-set.

If a file belongs to more than one sub-set, the batching step 108 may apply rules to keep the file in only one of the sub-sets according to defined rules reflecting a user's preference. For example, it may be kept in a sub-set having the earliest or the latest time instance. In another example, it may be kept in a sub-set having the fewest files in the sub-set.

In the example of a renewal period for an electronic file, a decision which gives the optimal set of renewal times might depend on various factors including:
- a latest time in a renewal time might reduce overall regularity of the renewal operation, which may give an improvement in performance, for example;
- an earliest time may improve security, so credentials are renewed at the shortest valid interval possible giving attackers the least time to crack them;
- as the different algorithms used in deriving the minimum times give different sets of interval overlaps, some may produce more renewal intervals than others. To reduce network overhead, the optimal choice may be based upon the least number of renewals rather than the timing.

The method of FIG. 1 may be repeated when a file is added or removed from a set of files so that new optimal time instances for the new set of files may be calculated.

Figure 2:
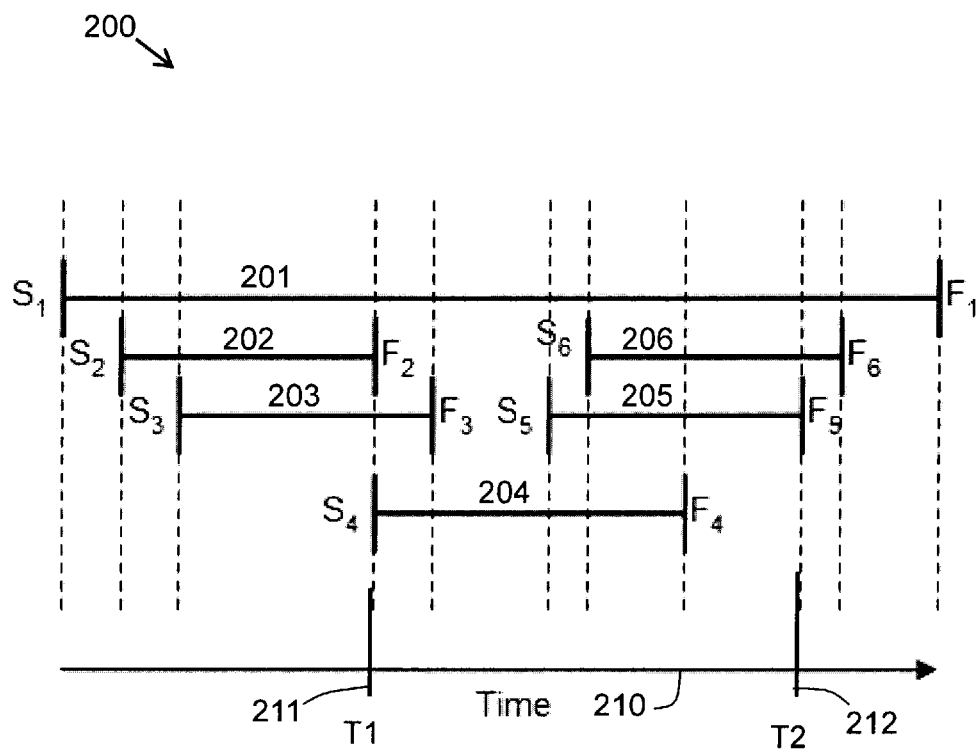
FIG. 2 is a schematic diagram illustrating an application of the method of FIG. 1, in accordance with an aspect of the present invention.

Referring to FIG. 2, a schematic diagram 200 shows an example of the described method. In this example embodiment, six files' processing time periods 201-206 are shown against a timeline 210. Each of the processing time periods 201-206 has a start time $S_{1-6}$ and a finish time $F_{1-6}$.

Using the method of FIG. 1, a minimal set of time instances Tm that give at least one time instance in each time period in the set is identified as time $T_1$ 211 which includes time periods 1 201, 2 202, 3 203 and 4 204 and time $T_2$ 212 which includes time periods 1 201, 5 205 and 6 206. It should be noted that these are not the only possible time instances and additional influences may be applied, for example, to favor the latest possible times or earliest possible times. For time periods which cover both time instances, one of the time instances may be used.

In an example of renewal of files in the form of certificates, the file processing manager is configured with an acceptable certificate renewal window for each file it manages. For example, between 40-60% of the lifetime of the file.

Across the systems managed, the file processing manager may have a set of intervals as shown in FIG. 2 noting that this diagram shows the acceptable refresh time for each certificate, not the certificate lifetime.

In this example, there are six files whose lifecycles are being managed, indicated by the suffixes on the renewal interval starts and finishes. The certificates have different validity periods resulting in quite different renewal intervals.

Once the set of start and finish times is identified, the minimal set of time instances can be determined that gives one point in every time period. Algorithms for this are well known. Different forms of algorithms may give differing results (whilst still resulting in a minimum set of time results) depending on the approach taken.

For example, one method may start from an earliest time and place a point at the first finish time arrived at ($F_2$). This will satisfy the first interval and any intervals that overlap it. Then continue to the finish time of the next interval ($S_5$-$F_5$) that does not yet contain a point and place a point at that finish time ($F_5$). Repeat this step until all the intervals contain a point. In this example, $T_1$ at $F_2$ and $T_2$ at $F_5$ would result with this method. That is to say, that if certificate renewal requests are issued at time $F_2$ and $F_5$, then it is possible to satisfy the renewal time criteria for all certificates.

In another example, another method is used which reverses this process to start with the latest finish time and work backwards looking for the next start time hit, with the option here to choose that time as the renewal. This will give different renewal times for the same set of intervals, preferring later renewals over earlier ones. In FIG. 2, with the one method, interval $S_4$-$F_4$ would renew at $S_4$, whereas with the reverse process, the interval $S_4$-$F_4$ would renew at the later time of $S_6$.

This gives a set of time points at which to renew certificates with the minimal set of request overheads.

Figure 3:
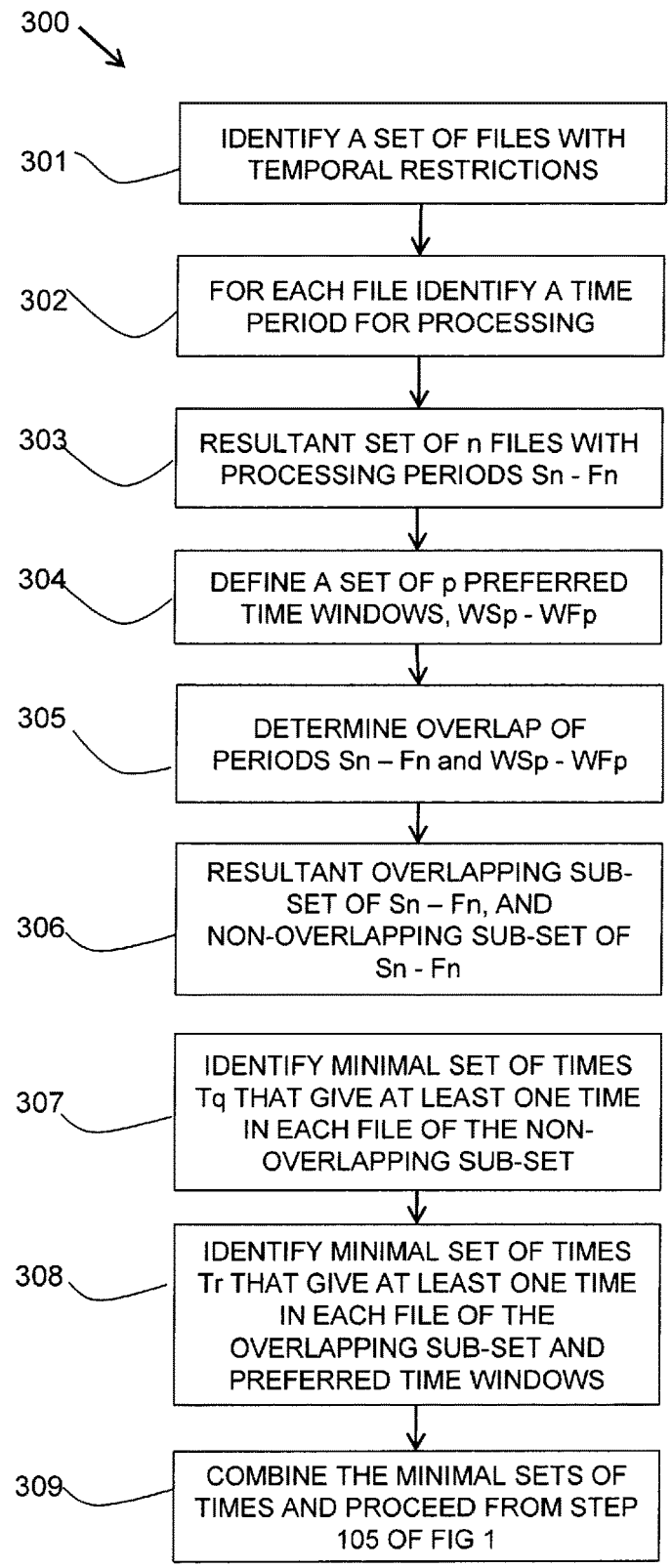
FIG. 3 is a flow diagram of an example embodiment of a further aspect of a method, in accordance with an aspect of the present invention.

Referring to FIG. 3, a flow diagram 300 shows an example of an embodiment using additional steps to further refine one or more aspects of the described method.

The steps of 301 to 303 are the same as those described for steps 101 to 103 of FIG. 1 resulting in a set of time periods $S_n$ to $F_n$.

In this embodiment, one or more preferred time windows WSp to WFp may be defined 304. The preferred windows enable a preference for time periods to be incorporated into the selection of the time instances. For example, a preferred time window may be when there is a lower network load.

It is then determined 305 if there is an overlap between each of the set of time periods $S_n$ to $F_n$ and each of the one or more preferred time windows WSp to WFp resulting 306 in an overlapping sub-set of time periods and a non-overlapping sub-set of time periods.

The non-overlapping sub-set of time periods is processed 307 to identify the minimal set of time instances Tq that give at least one time instance in each time period in the sub-set. This gives a minimized number of time instances outside of the preferred windows.

The overlapping sub-set of time periods is processed 308 together with the one or more preferred time windows to identify the minimal set of time instances Tr that give at least one time instance in each time period in the sub-set and the preference time windows. This will ensure a minimal set of time instances is chosen that are all within a preferred window.

The minimal sets of times of steps 307 and 308 are combined 309 to result in a set of time instances which optimizes the processing of the files whilst ensuring that, where possible, the time instances are within the preferred time window(s).

The method may then continue according to the steps 105 to 109 of FIG. 1.

Figure 4:
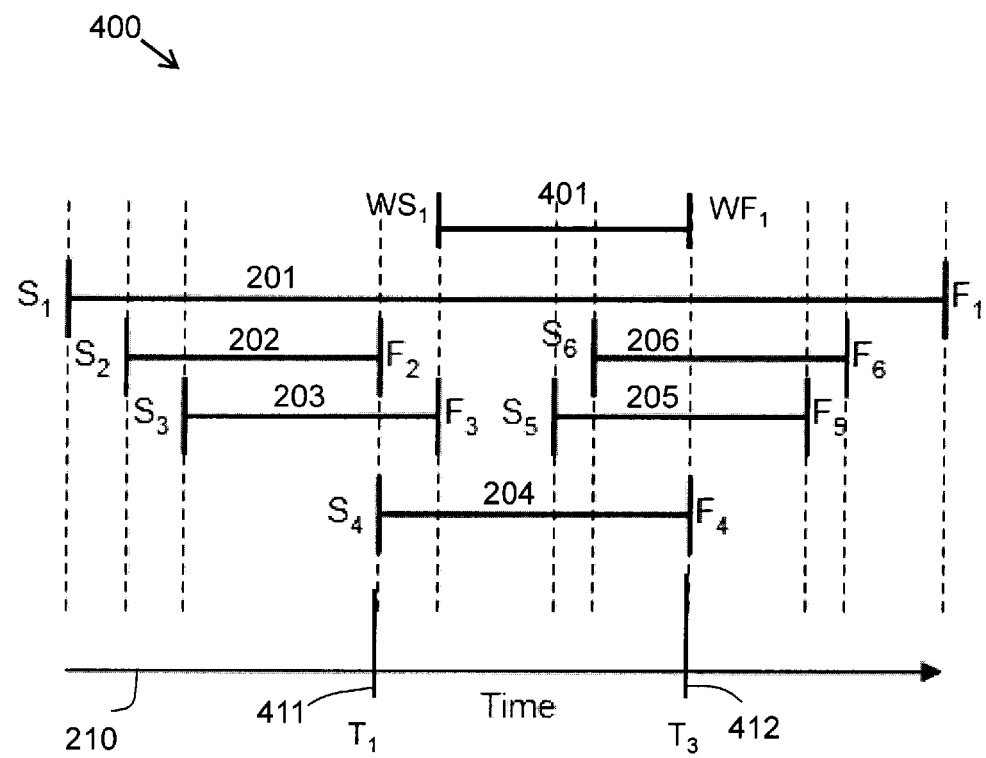
FIG. 4 is a schematic diagram illustrating an application of the method of FIG. 3, in accordance with an aspect of the present invention.

Referring to FIG. 4, a schematic diagram 400 shows the example of FIG. 2 amended to add a preferred time window $WS_1$ to $WF_1$ 401. Six files' processing time periods 201-206 are shown against a timeline 210. Each of the processing time periods 201-206 has a start time $S_{1-6}$ and a finish time $F_{1-6}$.

Using the method of FIG. 3, the time periods 1 201, 3 203, 4 204, 5 205 and 6 206 overlap with the preferred time window 401. Time period 2 202 does not overlap with the preferred time window 401.

The sub-set of the non-overlapping time period 2 202 is processed to identify the minimal set of time instances and time instance $T_1$ 411 is resulted.

The sub-set of the overlapping time periods 1 201, 3 203, 4 204, 5 205 and 6 206 overlap and the preferred time window 401 are processed to identify the minimal set of time instances and time instance $T_3$ 412 is resulted.

The resultant time instances are combined to result in time instances $T_1$ 411 and $T_3$ 412 as being the optimal and minimum time instances to process the files.

The above example uses time-dependent files in the form of security certificates requiring renewal. Another example embodiment, is time-dependent files in the form of files needing security updates. A distributed set of systems may occasionally poll a central server for security/software updates. When new updates are discovered, the system may not want to apply them immediately, perhaps preferring to apply them at low network usage times, and so may be given a window in which the security patch may be applied. Known security processes, as an example, give time windows in which security updates are to be applied and systems patched. Using the processes described herein along with preferred time windows for patch downloads, the system could decide optimal time slices at which to download and apply patches. Time windows would be likely to vary based upon the severity of the vulnerability being patched.

Figure 5:
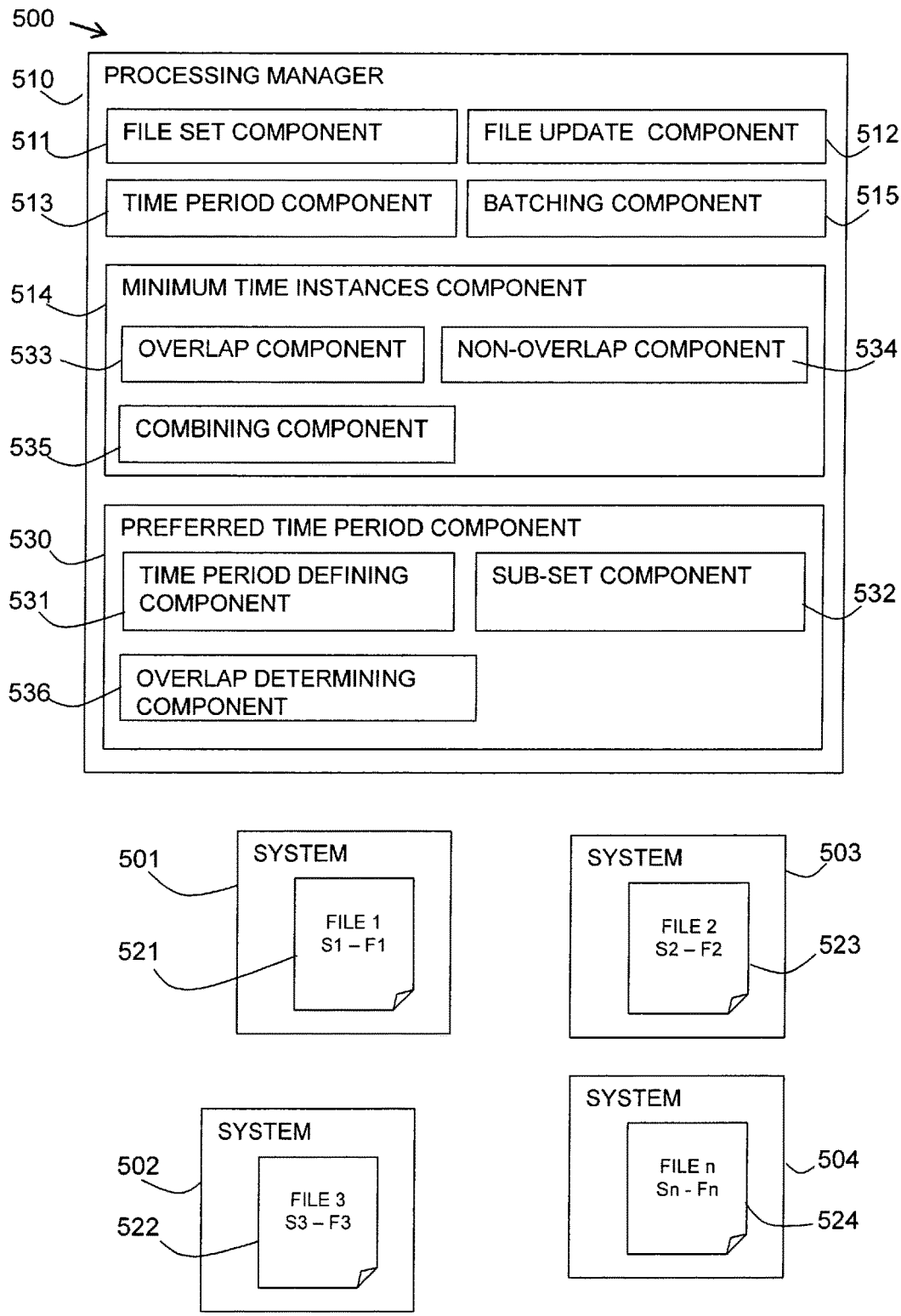
FIG. 5 is block diagram of an example embodiment of a system in accordance with an aspect of the present invention.

Referring to FIG. 5, a block diagram shows an example embodiment of the described system 500.

The system 500 includes a processing manager 510 which handles the processing of files 521-524 across a cluster of systems 501-504. In FIG. 5, a simple arrangement of systems 501-504 with a single file 521-524 in each system 501-504 is shown for simplicity. It will be appreciated that many different arrangements of systems and files may use the described processing manager 510.

The processing manager 510 may include a file set component 511 for referencing a set of time-dependent files. A file update component 512 may be provided for adding or removing files from the file set component 511 and thereby triggering a new calculation of time instances for processing of the files. A time period component 513 may be provided for identifying a time period for processing for each file identified in the file set component 511.

A minimum time instances component 514 may be provided for determining time instances at which processing of the files should optimally take place.

A batching component 515 may batch a sub-set of files for each time instance determined by the minimum time instances component 514.

In one embodiment, a preferred time period component 530 may be provided including a time period defining component 531 for defining one or more preferred time periods at which there is optimized processing of files. The preferred time period component 530 may include an overlap determining component 536 and a sub-set component 532 for determining a sub-set of time periods which overlap with the one or more additional preferred time periods and for determining a second sub-set of the set of time periods which do not overlap with the one or more additional preferred time periods.

In this embodiment, the minimum time instances component 514 may include an overlap component 533 for calculating a minimum set of time instances that gives one time instance in each time period in the first sub-set and the one or more additional preferred time periods; 534 a non-overlap component for calculating a minimum set of time instances that gives one time instance in each time period in the second sub-set; and 535 a combining component for combining the two resultant minimum sets of time instances.

Figure 6:
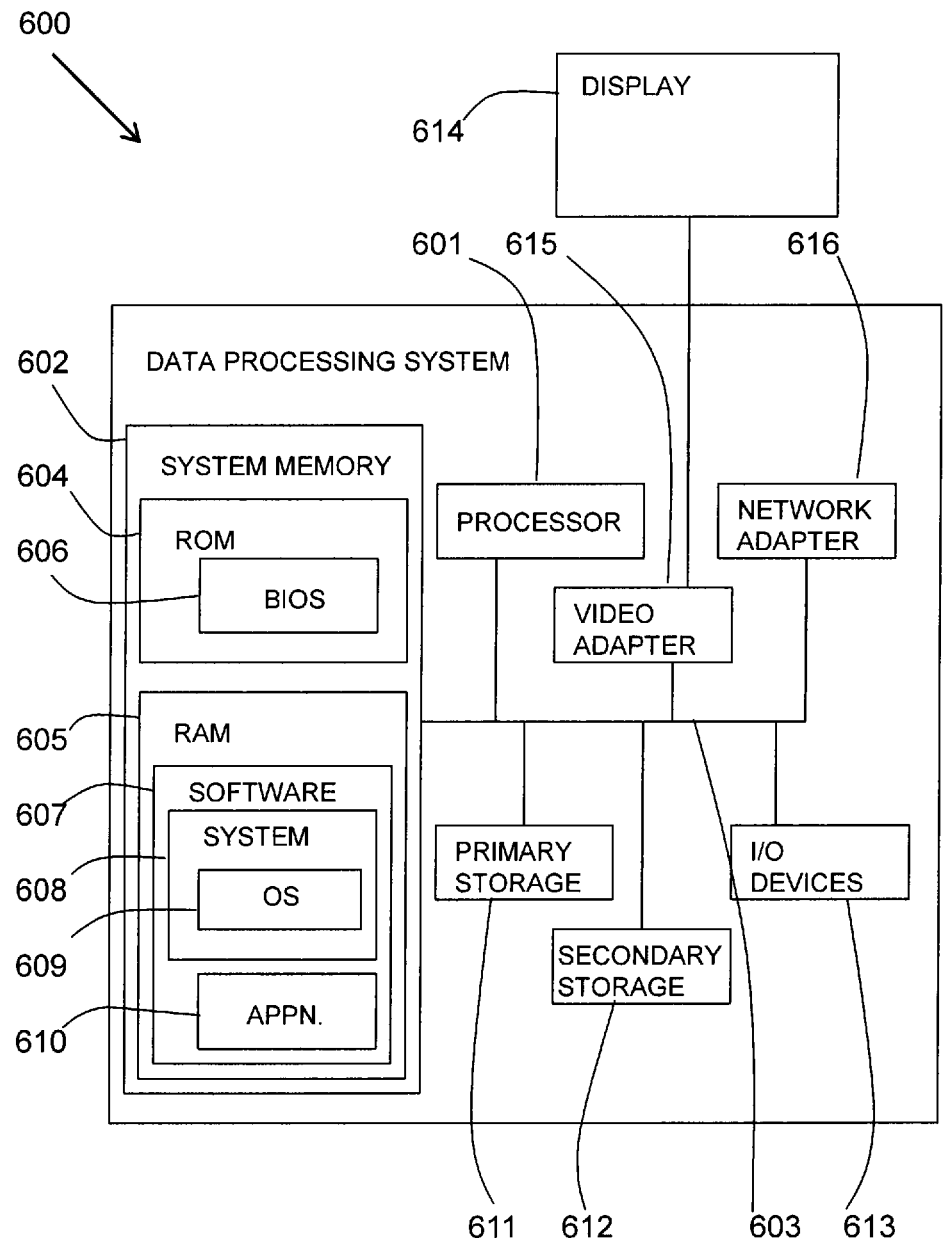
FIG. 6 is a block diagram of an embodiment of a computer system in which aspects of the present invention may be implemented.

Referring to FIG. 6, an example system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code is to be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

As described herein, according to one aspect of the present invention, there is provided a method for managing time-dependent electronic files, comprising: identifying a set of time-dependent files; identifying a time period for processing for each file resulting in a set of time periods; calculating a minimum set of time instances that gives one time instance in each time period in the set of time periods; and batching for each time instance of the minimum set of time instances, a sub-set of files to be processed at the time instance.

The method may include: defining one or more additional preferred time periods; determining a first sub-set of the set of time periods which overlap with the one or more additional preferred time periods; determining a second sub-set of the set of time periods which do not overlap with the one or more additional preferred time periods; and wherein calculating a minimum set of time instances that gives one time instance in each time period in the set of time periods includes: calculating a minimum set of time instances that gives one time instance in each time period in the first sub-set and the one or more additional preferred time periods; calculating a minimum set of time instances that gives one time instance in each time period in the second sub-set; and combining the two resultant minimum sets of time instances.

The one or more additional preferred time periods may be defined for time periods having optimal processing capability.

In one embodiment, the files are electronic certificates and a time period for processing a file is a renewal period for an electronic certificate. Batching, for each time instance of the minimum set of time instances, a sub-set of files to be processed at the time instance may include batching renewal messages for the sub-set of files. Identifying a time period for processing for each file resulting in a set of time periods may include determining a renewal period within a lifespan of an electronic certificate.

The method may be repeated when a file is added or removed from the identified set of files.

The batching for each time instance of the minimum set of time instances, a sub-set of files to be processed at the time instance, may include selecting a time instance for a file in which more than one time instance falls within the file's processing time period.

According to another aspect of the present invention, there is provided a system for managing time-dependent electronic files, comprising: a file set component for identifying a set of time-dependent files; a time period component for identifying a time period for processing for each file resulting in a set of time periods; a minimum time instances component for calculating a minimum set of time instances that gives one time instance in each time period in the set of time periods; and a batching component batching for each time instance of the minimum set of time instances, a sub-set of files to be processed at the time instance.

The system may include a preferred time period component including: a time period defining component for defining one or more additional preferred time periods; an overlap determining component for: determining a first sub-set of the set of time periods which overlap with the one or more additional preferred time periods; determining a second sub-set of the set of time periods which do not overlap with the one or more additional preferred time periods; and wherein the minimum time instances component for calculating a minimum set of time instances that gives one time instance in each time period in the set of time periods includes: an overlap component for calculating a minimum set of time instances that gives one time instance in each time period in the first sub-set and the one or more additional preferred time periods; a non-overlap component for calculating a minimum set of time instances that gives one time instance in each time period in the second sub-set; and a combining component for combining the two resultant minimum sets of time instances.

The time period defining component for defining one or more additional preferred time periods may have optimal processing capability.

In one embodiment, the files are electronic certificates and a time period for processing a file is a renewal period for an electronic certificate. The batching component may include batching renewal messages for the sub-set of files.

The system may include a file update component for updating the identified set of files when a file is added or removed.

The batching component for batching for each time instance of the minimum set of time instances, a sub-set of files to be processed at the time instance, may include selecting a time instance for a file in which more than one time instance falls within the file's processing time period.

According to yet another aspect of the present invention, there is provided a computer program stored on a computer readable medium and loadable into the internal memory of a digital computer, comprising software code portions, when said program is run on a computer, for performing the method of one aspect of the present invention.

Aspects of the invention provide batching time-dependent electronic files efficiently into a single renewal message, minimizing the number of messages sent.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of aspects of the present invention.

What is claimed is:

1. A method of managing time-dependent electronic files, the method comprising:
   identifying, by a file processing manager executing on one or more processors in a distributed computing system, a set of time-dependent files, wherein each time-dependent file of the set of time-dependent files comprises a temporal restriction preventing processing associated with the time-dependent file other than within the temporal restriction, wherein the identifying comprises:
      polling, by the one or more processors, one or more centralized servers for updates available for one or more files deployed on one or more computing resources comprising the distributed computing system;
      determining, by the one or more processors, based on the polling, that updates are available for a portion of the one or more files, wherein for each file of the portion of the one or more files, availability of an update for the file indicates the temporal restriction for the file; and
      identifying, by the file processing manager, the portion of the one or more files as the set of time-dependent files;
   identifying, by the file processing manager, a time period for processing for each time-dependent file of a plurality of time-dependent files of the set of time-dependent files, wherein the time periods for processing for each time-dependent file of the plurality of time-dependent files of the set of time-dependent files are different, and wherein for each time-dependent file the time period is consistent with the temporal restriction of the time-dependent file, resulting in a set of time periods, wherein for at least one time-dependent file of the plurality of time-dependent files, more than one time instance falls within the time period for processing for the at least one time-dependent file;
   based on the identifying the time period for processing for each time-dependent file, dynamically calculating, by the file processing manager, a minimum set of time instances that gives one time instance in each time period in the set of time periods, by identifying overlaps between time periods for processing for the plurality of time-dependent files to minimize a number of individual messages sent to the one or more centralized servers, wherein a single message is sent during each time instance; and
   batching, by the file processing manager, for each time instance of the minimum set of time instances, a sub-set of files for processing at the time instance, wherein the processing at each time instance comprises transmitting a message to the one or more centralized servers, and wherein the batching comprises minimizing a number of messages, wherein the processing comprises distributing, from the central location, a renewed version of the sub-set of files to replace the sub-set of files back to the one or more computing resources comprising the distributed computing system.

2. The method as claimed in claim 1, further including:
   defining one or more additional preferred time periods;
   determining a first sub-set of the set of time periods which overlap with the one or more additional preferred time periods;
   determining a second sub-set of the set of time periods which do not overlap with the one or more additional preferred time periods; and
   wherein the calculating the minimum set of time instances that gives one time instance in each time period in the set of time periods includes:
   calculating one resultant minimum set of time instances that gives one time instance in each time period in the first sub-set and the one or more additional preferred time periods;
   calculating another resultant minimum set of time instances that gives one time instance in each time period in the second sub-set; and
   combining the one resultant minimum set of time instances and the other resultant minimum set of time instances.

3. The method as claimed in claim 2, wherein the one or more additional preferred time periods are defined for time periods having optimal processing capability.

4. The method as claimed in claim 1, wherein the set of time-dependent files are electronic certificates, and the time period for processing a time-dependent file is a renewal period for an electronic certificate.

5. The method as claimed in claim 4, wherein the batching for each time instance of the minimum set of time instances, the sub-set of files for processing at the time instance, includes batching renewal messages for the sub-set of files.

6. The method as claimed in claim 4, wherein the identifying the time period for processing for each file includes determining a renewal period within a lifespan of an electronic certificate.

7. The method as claimed in claim 1, further comprising repeating at least one of the identifying the set of time-dependent files, the identifying the time period, the calculating, and the batching based on adding or removing from the identified set of time-dependent files.

8. The method as claimed in claim 1, wherein: the batching for each time instance of the minimum set of time instances, the sub-set of files for processing at the time instance, includes selecting a time instance for a file in which more than one time instance falls within the file's processing time period.

9. A computer system for managing time-dependent electronic files, the computer system comprising:
a memory; and
a processor in communications with the memory, wherein the computer system is configured to perform a method, said method comprising:
identifying, by a file processing manager executing on one or more processors in a distributed computing system, a set of time-dependent files, wherein each time-dependent file of the set of time-dependent files comprises a temporal restriction preventing processing associated with the time-dependent file other than within the temporal restriction, wherein the identifying comprises:
polling, by the one or more processors, one or more centralized servers for updates available for one or more files deployed on one or more computing resources comprising the distributed computing system;
determining, by the one or more processors, based on the polling, that updates are available for a portion of the one or more files, wherein for each file of the portion of the one or more files, availability of an update for the file indicates the temporal restriction for the file; and
identifying, by the file processing manager, the portion of the one or more files as the set of time-dependent files;
identifying, by the file processing manager, a time period for processing for each time-dependent file of a plurality of time-dependent files of the set of time-dependent files, wherein the time periods for processing for each time-dependent file of the plurality of time-dependent files of the set of time-dependent files are different, and wherein for each time-dependent file the time period is consistent with the temporal restriction of the time-dependent file, resulting in a set of time periods, wherein for at least one time-dependent file of the plurality of time-dependent files, more than one time instance falls within the time period for processing for the at least one time-dependent file;
based on the identifying the time period for processing for each time-dependent file, dynamically calculating, by the file processing manager, a minimum set of time instances that gives one time instance in each time period in the set of time periods, by identifying overlaps between time periods for processing for the plurality of time-dependent files to minimize a number of individual messages sent to the one or more centralized servers, wherein a single message is sent during each time instance; and
batching, by the file processing manager, for each time instance of the minimum set of time instances, a sub-set of files for processing at the time instance, wherein the processing at each time instance comprises transmitting a message to the one or more centralized servers, and wherein the batching comprises minimizing a number of messages, wherein the processing comprises distributing, from the central location, a renewed version of the sub-set of files to replace the sub-set of files back to the one or more computing resources comprising the distributed computing system.

10. The computer system as claimed in claim 9, wherein the method further includes:
defining one or more additional preferred time periods;
determining a first sub-set of the set of time periods which overlap with the one or more additional preferred time periods;
determining a second sub-set of the set of time periods which do not overlap with the one or more additional preferred time periods; and
wherein the calculating the minimum set of time instances that gives one time instance in each time period in the set of time periods includes:
calculating one resultant minimum set of time instances that gives one time instance in each time period in the first sub-set and the one or more additional preferred time periods;
calculating another resultant minimum set of time instances that gives one time instance in each time period in the second sub-set; and
combining the one resultant minimum set of time instances and the other resultant minimum set of time instances.

11. The computer system as claimed in claim 9, wherein the set of time-dependent files are electronic certificates, and the time period for processing a time-dependent file is a renewal period for an electronic certificate.

12. The computer system as claimed in claim 11, wherein the batching for each time instance of the minimum set of time instances, the sub-set of files for processing at the time instance, includes batching renewal messages for the sub-set of files.

13. The computer system as claimed in claim 9, wherein the method further comprises repeating at least one of the identifying the set of time-dependent files, the identifying the time period, the calculating, and the batching based on adding or removing from the identified set of time-dependent files.

14. The computer system as claimed in claim 9, wherein: the batching for each time instance of the minimum set of time instances, the sub-set of files for processing at the time instance, includes selecting a time instance for a file in which more than one time instance falls within the file's processing time period.

15. A computer program product for managing time-dependent electronic files, the computer program product comprising:
a computer readable storage medium readable by a processing circuit and storing instructions for execution by the processing circuit for performing a method comprising:
identifying, by a file processing manager executing on one or more processors in a distributed computing system, a set of time-dependent files, wherein each time-dependent file of the set of time-dependent files comprises a temporal restriction preventing processing associated with the time-dependent file other than within the temporal restriction, wherein the identifying comprises:
polling, by the one or more processors, one or more centralized servers for updates available for one or more files deployed on one or more computing resources comprising the distributed computing system;
determining, by the one or more processors, based on the polling, that updates are available for a portion of the one or more files, wherein for each file of the portion of the one or more files, availability of an update for the file indicates the temporal restriction for the file; and identifying, by the file processing manager, the portion of the one or more files as the set of time-dependent files;

identifying, by the file processing manager, a time period for processing for each time-dependent file of a plurality of time-dependent files of the set of time-dependent files, wherein the time periods for processing for each time-dependent file of the plurality of time-dependent files of the set of time-dependent files are different, and wherein for each time-dependent file the time period is consistent with the temporal restriction of the time-dependent file, resulting in a set of time periods, wherein for at least one time-dependent file of the plurality of time-dependent files, more than one time instance falls within the time period for processing for the at least one time-dependent file;

based on the identifying the time period for processing for each time-dependent file, dynamically calculating, by the file processing manager, a minimum set of time instances that gives one time instance in each time period in the set of time periods, by identifying overlaps between time periods for processing for the plurality of time-dependent files to minimize a number of individual messages sent to the one or more centralized servers, wherein a single message is sent during each time instance; and batching, by the file processing manager, for each time instance of the minimum set of time instances, a sub-set of files for processing at the time instance, wherein the processing at each time instance comprises transmitting a message to the one or more centralized servers, and wherein the batching comprises minimizing a number of messages, wherein the processing comprises distributing, from the central location, a renewed version of the sub-set of files to replace the sub-set of files back to the one or more computing resources comprising the distributed computing system.

16. The computer program product as claimed in claim 15, wherein the method further includes:

defining one or more additional preferred time periods;

determining a first sub-set of the set of time periods which overlap with the one or more additional preferred time periods;

determining a second sub-set of the set of time periods which do not overlap with the one or more additional preferred time periods; and wherein the calculating the minimum set of time instances that gives one time instance in each time period in the set of time periods includes:

calculating one resultant minimum set of time instances that gives one time instance in each time period in the first sub-set and the one or more additional preferred time periods;

calculating another resultant minimum set of time instances that gives one time instance in each time period in the second sub-set; and combining the one resultant minimum set of time instances and the other resultant minimum set of time instances.

17. The computer program product as claimed in claim 15, wherein the set of time-dependent files are electronic certificates, and the time period for processing a time-dependent file is a renewal period for an electronic certificate.

18. The computer program product as claimed in claim 17, wherein the batching for each time instance of the minimum set of time instances, the sub-set of files for processing at the time instance, includes batching renewal messages for the sub-set of files.

19. The computer program product as claimed in claim 15, wherein the method further comprises repeating at least one of the identifying the set of time-dependent files, the identifying the time period, the calculating, and the batching based on adding or removing from the identified set of time-dependent files.

20. The computer program product as claimed in claim 15, wherein: the batching for each time instance of the minimum set of time instances, the sub-set of files for processing at the time instance, includes selecting a time instance for a file in which more than one time instance falls within the file's processing time period.

\* \* \* \* \*